United States Patent
Senroy et al.

(10) Patent No.: US 7,908,103 B2
(45) Date of Patent: Mar. 15, 2011

(54) SYSTEM AND METHODS FOR DETERMINING MASKING SIGNALS FOR APPLYING EMPIRICAL MODE DECOMPOSITION (EMD) AND FOR DEMODULATING INTRINSIC MODE FUNCTIONS OBTAINED FROM APPLICATION OF EMD

(76) Inventors: Nilanjan Senroy, New Delhi (IN); Siddharth Suryanarayanan, Littleton, CO (US)

( * ) Notice: Subject to any disclaimer, the term of this patent is extended or adjusted under 35 U.S.C. 154(b) by 259 days.

(21) Appl. No.: 12/124,843

(22) Filed: May 21, 2008

(65) Prior Publication Data

US 2009/0116595 A1 May 7, 2009

Related U.S. Application Data

(60) Provisional application No. 60/939,226, filed on May 21, 2007.

(51) Int. Cl.
*G06F 7/50* (2006.01)

(52) U.S. Cl. ............ 702/75; 702/76; 702/79; 702/189; 702/190; 702/194; 702/199; 324/309; 708/300; 708/303; 708/304; 708/317; 708/320

(58) Field of Classification Search .............. 702/79, 702/76, 190, 194, 189, 199; 708/300, 303, 708/304, 317, 320; 324/309
See application file for complete search history.

(56) References Cited

U.S. PATENT DOCUMENTS

| | | | | |
|---|---|---|---|---|
| 5,673,289 A * | 9/1997 | Kim et al. | ...... | 704/229 |
| 5,983,162 A * | 11/1999 | Huang | ...... | 702/4 |
| 6,192,758 B1 * | 2/2001 | Huang | ...... | 73/579 |
| 6,311,130 B1 | 10/2001 | Huang | | |
| 6,381,559 B1 * | 4/2002 | Huang | ...... | 702/194 |
| 6,738,734 B1 * | 5/2004 | Huang | ...... | 702/194 |
| 6,862,558 B2 * | 3/2005 | Huang | ...... | 702/194 |
| 6,901,353 B1 | 5/2005 | Huang | | |
| 6,990,436 B1 * | 1/2006 | Huang | ...... | 702/199 |
| 7,054,792 B2 * | 5/2006 | Frei et al. | ...... | 702/190 |
| 7,346,461 B2 * | 3/2008 | Huang et al. | ...... | 702/56 |
| 7,602,985 B2 * | 10/2009 | Gao et al. | ...... | 382/240 |
| 2002/0099475 A1 * | 7/2002 | Spangler et al. | ...... | 700/280 |
| 2003/0033094 A1 * | 2/2003 | Huang | ...... | 702/39 |
| 2007/0082652 A1 * | 4/2007 | Hartigan et al. | ...... | 455/404.2 |
| 2007/0214940 A1 * | 9/2007 | Stoneback | ...... | 84/600 |
| 2009/0222261 A1 * | 9/2009 | Jung et al. | ...... | 704/219 |
| 2009/0281812 A1 * | 11/2009 | Jung et al. | ...... | 704/500 |

* cited by examiner

*Primary Examiner* — Carol S Tsai
(74) *Attorney, Agent, or Firm* — Novak Druce + Quigg LLP (57) ABSTRACT

A computer-implemented method of signal processing is provided. The method includes generating one or more masking signals based upon a computed Fourier transform of a received signal. The method further includes determining one or more intrinsic mode functions (IMFs) of the received signal by performing a masking-signal-based empirical mode decomposition (EMD) using the at least one masking signal.

14 Claims, 9 Drawing Sheets

SYSTEM AND METHODS FOR DETERMINING MASKING SIGNALS FOR APPLYING EMPIRICAL MODE DECOMPOSITION (EMD) AND FOR DEMODULATING INTRINSIC MODE FUNCTIONS OBTAINED FROM APPLICATION OF EMD

CROSS-REFERENCE TO RELATED APPLICATIONS

This application claims the priority of U.S. Provisional Application No. 60/939,226, which was filed on May 21, 2007 and which is incorporated herein in its entirety.

STATEMENT REGARDING FEDERALLY SPONSORED RESEARCH OR DEVELOPMENT

Development of this invention was supported in part by Grant No. N0014-02-1-0623 awarded by the U.S. Office of Naval Research and Award No. DE-FG02-05CH11292 awarded by the U.S. Department of Energy. Accordingly, the United States Government may have certain rights in the invention.

FIELD OF THE INVENTION

The present invention is related to the field of signal processing, and, more particularly, to processing and analyzing time-varying waveforms.

BACKGROUND OF THE INVENTION

A widely-used technique for processing and analyzing electrical signals, as well as other phenomena and data, is Fourier analysis. Generally, Fourier spectral analysis provides a technique for examining global energy-frequency distributions. Fourier analysis is in some respects quite limited, however. Even though Fourier transform is valid under very general conditions, Fourier spectral analysis requires that a system be linear and that the data analyzed be strictly periodic or stationary. (See, e.g., N. E. Huang, et al., "The Empirical Mode Decomposition and The Hilbert Spectrum for Nonlinear and Non-stationary Time Series Analysis," Proc. R. Soc. Lond. A. (1998) 454, 903-995.)

Other techniques for processing and analyzing non-stationary data have been developed. These techniques include the spectrogram method, wavelet analysis, the Wigner-Ville distribution (also referred to as the Heisenberg wavelet), the evolutionary spectrum, and the empirical orthogonal function expansion. Typically, though, these techniques supplement, but still depend on, Fourier analysis. Accordingly, when applied to nonlinear systems, they can yield limited or even misleading results.

A context in which these traditional techniques are frequently inadequate is with respect to estimation time-varying distorted voltage and current signals. Accurate estimation of such signals is needed for determining innovative power quality indices and thresholds corresponding to electrical power systems, for example, as well as for determining equipment derating levels and for devising adequate mitigation methods, including harmonic filter designs.

In the context of estimating time-varying distorted signals, such as voltage and current signals generated with modem power systems, it is not appropriate to use harmonics (multiples of a sinusoidal wave) for describing the higher modes of oscillations that may be present in non-stationary and nonlinear waveform distortions. Harmonics imply stationarity and linearity among the modes of oscillations.

Moreover, in the specific context of estimating time-varying modes in distorted voltage and current signals, other factors must be taken into account. These factors include the relative smallness of the distortions magnitudes, typically ranging from 1-10% of the fundamental frequency for voltage and 10-30% of the fundamental frequency for current. Another factor is that the fundamental frequency may not be constant during periods of observation of the signals, which can result from load fluctuations and system transients. Still another factor is that the typical distortion frequencies of interest in electric power quality analysis may lie within an octave of one another, thus posing a separation challenge.

Accordingly, there is a need for more effective and efficient methods for processing and analyzing time-varying waveforms such as those corresponding to time-varying distorted voltage and current signals. One proposed technique for processing and analyzing non-stationary signals is the Hilbert-Huang (HH) method, which employs empirical mode decomposition (EMD). EMD, however, does not separate frequencies that lie within an octave of one another, which as already noted can be of particular concern in the context of electric power quality analysis. One proposed technique for improving EMD is to employ a masking signal to enhance the filtering capabilities of EMD. To date, however, there is not an effective and efficient technique for choosing appropriate masking signals to use in conjunction with the application of EMI. More particularly, there is not an effective and efficient technique for choosing masking signals that will ensure that application of END generates truly mono-component intrinsic mode functions (IMF)

Accordingly, there is yet a need for a technique to enhance the use of EMD, particularly in context of analyzing time-varying distorted voltage and current signals, by generating appropriate masking signals. There is also a need for a technique for demodulating IMFS obtained by applying EMD.

SUMMARY OF THE INVENTION

The invention is directed to systems and methods for generating appropriate masking signals for applying END to various types of signals and data. One aspect of the invention is that, with masking signals constructed according to the invention, lower amplitude modes present in measured signals can be accentuated. Another aspect of the invention is that with these masking signals so constructed modal frequencies that lie within the same octave can be separated. The invention is further directed to systems and methods that implement a demodulation technique to improve the instantaneous frequency and amplitude of intrinsic mode functions obtained. The invention additionally provides time-frequency-magnitude localization capabilities for distortion frequencies higher than a significant frequency. One application of the invention is with respect to electric power systems signal measurements, which are typically characterized by a significant fundamental frequency and weak higher frequency components.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION

The invention is directed to systems and methods for implementing a modified empirical mode decomposition (EMD). The modified EMD is implemented by decomposing a distorted waveform into multiple intrinsic mode functions (IMFs) that have well-behaved Hilbert transforms and by constructing, according to the procedure described below, appropriate masking signals that are utilized in conjunction with the EMD. Post processing can be performed utilizing a demodulation technique also described below. Subsequently, instantaneous frequencies and amplitudes existing in the IMFs are obtained based upon the Hilbert transform.

Prior to describing specific embodiments of the invention, the theoretical underpinnings of the modified EMD procedure are described. An underlying principle of the EMD is the concept of instantaneous frequency, which is defined as the derivative of the phase of an analytic signal. A mono-component signal has a unique, well-defined and positive instantaneous frequency represented by the derivative of the phase of the signal. Conversely, a signal characterized by multiple modes of oscillation, existing simultaneously, does not have any meaningful instantaneous frequency. Accordingly, a distorted signal having multiple oscillation modes must be decomposed into its constituent mono-component signals before the Hilbert transform.

The EMD recognizes oscillatory modes existing in time scales defined by the interval between local extrema of the signals. Once the time scales have been identified, IMFs with zero mean are sifted from the signals. The EMD can be performed according to the following procedure:

Identify local maxima and minima of distorted signal, s(t), (Step 1);

Perform cubic spline interpolation between the maxima and the minima to obtain the envelopes, eM(t) and em(t), respectively (Step 2);

Compute mean of the envelopes, $m(t)=(e_M(t)+e_m(t))/2$ (Step 3);

Extract c1(t)=s(t)−m(t) (Step 4);

c1(t) is an IMF if the number of local extrema of c1(t), is equal to or differs from the number of zero crossings by one, and if the average of c1(t) is reasonably zero (Step 5). If c1(t) is not an IMF, then repeat Steps 1-4 on c1(t) instead of s(t) until the new c1(t) obtained satisfies the conditions of an IMF;

Compute the residue, r1(t)=s(t)−c1(t) (Step 6); and

If the residue, r1(t), is above a threshold value of error tolerance, then repeat steps 1-6 on r1(t), to obtain the next IMF and a new residue (Step 7).

An appropriate stopping criterion at Step 5 avoids 'over-improving' c1(t), as doing so can result in a significant loss of information. The first IMF obtained consists of the highest frequency components present in the original signal. The subsequent IMFs obtained contain progressively lower frequency components of the signal. If n orthogonal IMFs are obtained in this iterative manner, then the original signal can be reconstructed as, $$s(t) = \sum_n c_i(t) + r(t).$$

The final residue exhibits any general trends in the original signal.

Constructing Masking Signals to Separate Higher Frequencies

One aspect of the invention, as already noted, is the construction of an appropriate masking signal so as to provide a masking-signal-based EMD. The appropriate masking signal is one constructed to extract the highest frequency component of a signal; the masking signal frequency is greater than the highest frequency present in a distorted signal being processed or analyzed. (See inventors' paper, An Improved Hilbert-Huang Method for Analysis of Time-Varying Waveforms in Power Quality included in the APPENDIX attached hereto.)

A typical distorted power quality waveform consists of weak higher frequency modes whose frequencies may share the same octave. The fast Fourier transform (FFT) spectrum of the signal yields its approximate modal content. Masking signals, constructed according to the procedure described herein, can separate modes of oscillations whose frequencies lie within the same octave. The masking signals also can accentuate weak, higher-frequency signals so that the weak, higher-frequency signals can be sifted out during the EMD. The appropriate masking signals are constructed as follows:

Perform FFT on the distorted signal, s(t), to estimate frequency components $f_1, f_2, \ldots, f_n$, where $f_1<f_2<\ldots<f_n$ (Step 1). (Note: $f_1, f_2, \ldots, f_n$, are the stationary equivalents of the possibly time-varying frequency components);

Construct masking signals, $mask_2, mask_3 \ldots mask_n$, where $mask_k(t)=M_k \times \sin(2\pi(f_k+f_{k-1})t)$ (Step 2). In the specific context of analyzing electrical power quality, the inventors have determined that an effective value of $M_k$ is 5.5× magnitude of $f_k$ obtained in the FFT spectrum. Accordingly, the value of $M_k$ can be empirically determined depending on the specific application. (See inventors' paper, An Improved Hilbert-Huang Method for Analysis of Time-Varying Waveforms in Power Quality included in the APPENDIX attached hereto.)

Obtain two signals $(s(t)+mask_n)$ and $(s(t)-mask_n)$, and perform EMD Steps 1-5, described above, on both signals to obtain their first IMFs only, IMF$_+$ and IMF$_-$ (Step 3). Then c1(t)=(IMF$_+$+IMF$_-$)/2;

Obtain the residue, r1(t)=s(t)−c1(t) (Step 4);

Perform Steps 3 and 4 iteratively using the other masking signals and replacing s(t) with the residue obtained, until n−1 IMFs containing frequency components $f_2, f_3, \ldots f_n$ are extracted (Step 5). The final residue $r_n(t)$ contains the remaining component $f_1$.

Each IMF extracted using the masking signal based EMD contains a dominant high frequency component, along with a remnant lower frequency component. The amplitude and instantaneous frequency, extracted by Hilbert transform, shows a resultant modulation.

Demodulation of IMFs

Another aspect of the invention is a procedure to separate such an IMF into its components. Consider the amplitude modulated (AM) signal represented by the following equation, $$s(t)=A_1 \sin(\omega_1 t)+A_2 \sin(\omega_2 t), \qquad (1)$$

where $\omega_2 > \omega_1$. The Hilbert transform of s(t) is $s_H(t)$, and the analytical signal corresponding to s(t) is $$S_A(t) = s(t) + is_H(t) = A_1 e^{i\omega_1 t} + A_2 e^{i\omega_2 t} = A(t) \cdot e^{i\phi(t)} \quad (2)$$

where A(t) is the instantaneous magnitude and $\phi(t)$ is the instantaneous phase. From equation (2), the instantaneous magnitude is $$A(t) = \sqrt{A_1^2 + A_2^2 + 2A_1 A_2 \cos[(\omega_1 - \omega_2)t]} \quad (3)$$

In a modulated signal, the local extrema points may be obtained as follows $$\min(A(t)) = |A_1 - A_2| \text{ and } \max(A(t)) = A_1 + A_2. \quad (4)$$

Two envelopes corresponding to the maximum envelope, $\Gamma_{max}$, and the minimum envelope, $\Gamma_{min}$, of the amplitude can be obtained by applying cubic spline fitting among the local extrema points. The true amplitudes of the two components are therefore $$A_1 = (\Gamma_{max} + \Gamma_{min})/2 \text{ are } A_2 = (\Gamma_{max} - \Gamma_{min})/2 \quad (5)$$

From Equation 2, the instantaneous frequency of the signal is defined as $\omega(t) = d\phi(t)/dt$. Also $$\omega(t) = \text{Im}\left\{\frac{\dot{s}_A(t)}{s_A(t)}\right\} = \text{Im}\left\{\frac{A_1 e^{i\omega_1 t} \cdot i\omega_1 + A_2 e^{i\omega_2 t} \cdot i\omega_2}{A_1 e^{i\omega_1 t} + A_2 e^{i\omega_2 t}}\right\}. \quad (6)$$

For the specific case of a modulation between two pure tones, the instantaneous frequency is, $$\omega(t) = \omega_1 + \frac{A_1(t)A_2(t)\cos[(\omega_1 - \omega_2)t] + A_2(t)^2}{A_1(t)^2 + A_2(t)^2 + 2A_1(t)A_2(t)\cos[(\omega_1 - \omega_2)t]} \cdot (\omega_2 - \omega_1). \quad (7)$$

Substituting $x = A_1/A_2$ in Equation 7 yields $$\omega(t) = \omega_1 + \frac{\cos[(\omega_1 - \omega_2)t] + 1/x}{2\cos[(\omega_1 - \omega_2)t] + x + 1/x} \cdot (\omega_2 - \omega_1) \quad (8)$$

$$= \omega_1 + \frac{\cos(\omega_2 - \omega_1)}{2 + \frac{(x + 1/x)}{\left(\cos[(\omega_1 - \omega_2)t] + \frac{1}{x}\right)}}.$$

From Equation 3, the locally maximum magnitude occurs at $t_M$, when $\cos[(\omega_1 - \omega_2)t] = 1$. At this instant, the instantaneous frequency from Equation 8 is $$\omega(t_M) = \omega_1 + \frac{\omega_2 - \omega_1}{1 + x}. \quad (9)$$

Similarly, the locally minimum magnitude occurs at $t_m$, when $\cos[(\omega_1 - \omega_2)t] = -1$. The instantaneous frequency at this instant in time is $$\omega(t_M) = \omega_1 + \frac{\omega_2 - \omega_1}{1 - x}. \quad (10)$$

Given the instantaneous magnitude and frequency for each IMF, the modulating frequencies can be calculated by solving Equations 9 and 10.

Figure 1:
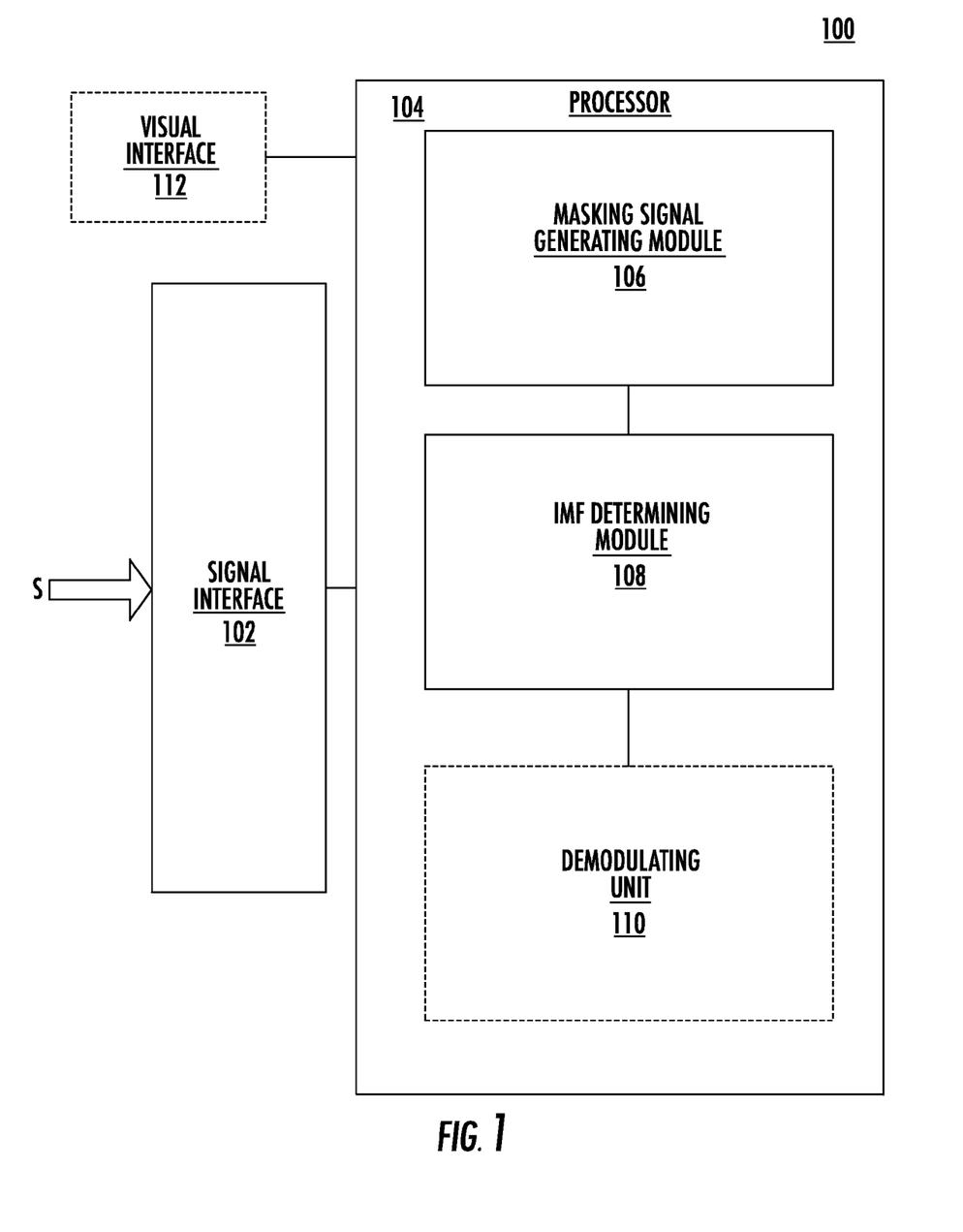
FIG. 1 is a schematic view of a system for processing signals, according to one embodiment of the invention.

FIG. 1 is a schematic view of a system 100 for processing signals, according to one embodiment of the invention. The system 100 illustratively includes a signal interface 102 for receiving an external signal, S. The external signal, S, can be generated by an electronic sensor, for example, or various types of transducers configured to generate an electrical signal in response to various types of physical phenomena. The signal interface 102, optionally, can comprise an analog-to-digital (A/D) converter (not shown) for converting an analog signal into a digital signal. The system 100 further illustratively includes a processor 104 in electronic communication with the signal interface 102, the processor having different modules for performing the various signal processing functions described more particularly below.

As further illustrated, the processor 104 includes a masking signal generating module 106. The masking signal generating module 106 is configured to generate at least one masking signal. As further described herein the masking signal is generated based upon a computed Fourier transform of the received external signal. Additionally, the processor 104 includes an IMF determining module 108 configured to determine one or more IMFs of the received external signal, S. The IMF determining module 108 determines IMFs by performing a masking-signal-based empirical mode decomposition (EMD) using the at least one masking signal, as also described more particularly below.

The masking signal generating module 106 and the IMF determining module 108 can be implemented in computer-readable instruction code configured to execute on a general-purpose or application-specific computer. In an alternate embodiment, however, one or both of the modules can be implemented in dedicated hardwired circuitry. According to still another embodiment, one or both of the masking signal generating module 106 and the IMF determining module 108 can be implemented in a combination of hardwired circuitry and computer-readable instruction code. Optionally, the signal processing system 100 can further include a demodulating unit 110 configured to demodulate each IMF determined for the received external signal, S.

According to another embodiment, the signal processing system 100 additionally includes a de-trending module (not shown) for de-trending the received external signal, S. In still another embodiment, the signal processing system 100 further includes a visual interface 112 for visually presenting each IMF obtained by performing the masking-signal-based EMD. If the system includes the demodulating unit 110, the visual interface 112 can also be configured to visually present each individual distortion component of the received external signal, S, each distortion component being obtained by demodulating each IMF determined for the received external signal according to the procedures described below.

Figure 2:
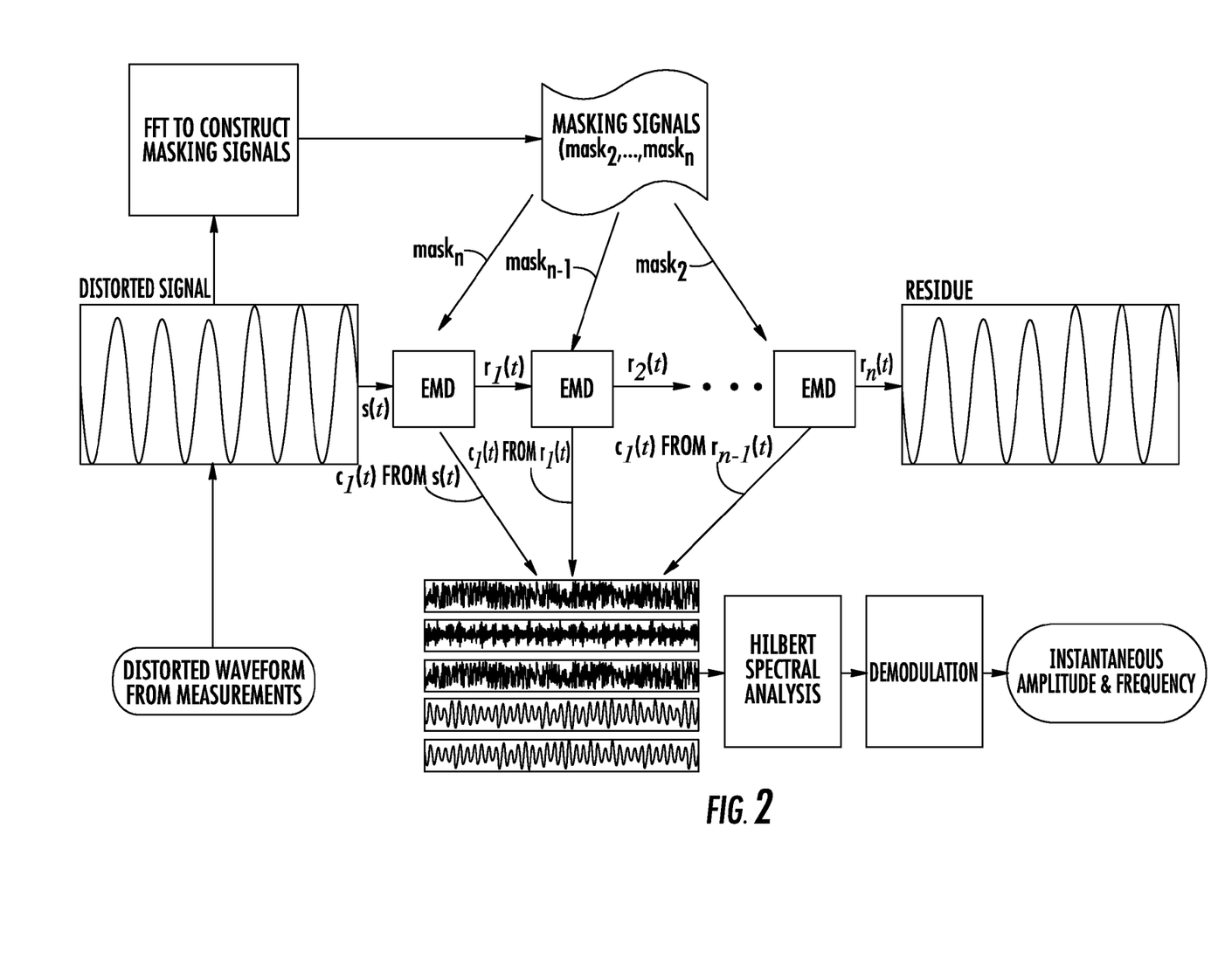
FIG. 2 is a schematic view of procedures implemented by the system illustrated shown in FIG. 1.

Referring additionally to FIG. 2, the operative features of the signal processing system 100 are schematically illustrated. Illustratively, the external signal, S, is a plurality of signals characterized by the distorted waveform shown. The masking signal generating module 106 generates a plurality of masking signals, $mask_i$, i=2, 3, ..., n, utilizing a fast Fourier transform (FFT) as applied to the signals. The masking signals so generated enable the IMF determining module 108 to performing a masking-signal-based EMD to determine corresponding IMFs, from which can be computed the reside shown. Optionally, Hilber spectral analysis also can be performed, and the demodulating unit 110 can demodulate each IMF to yield the corresponding instantaneous amplitude and frequency values as also illustrated.

Figure 3A:
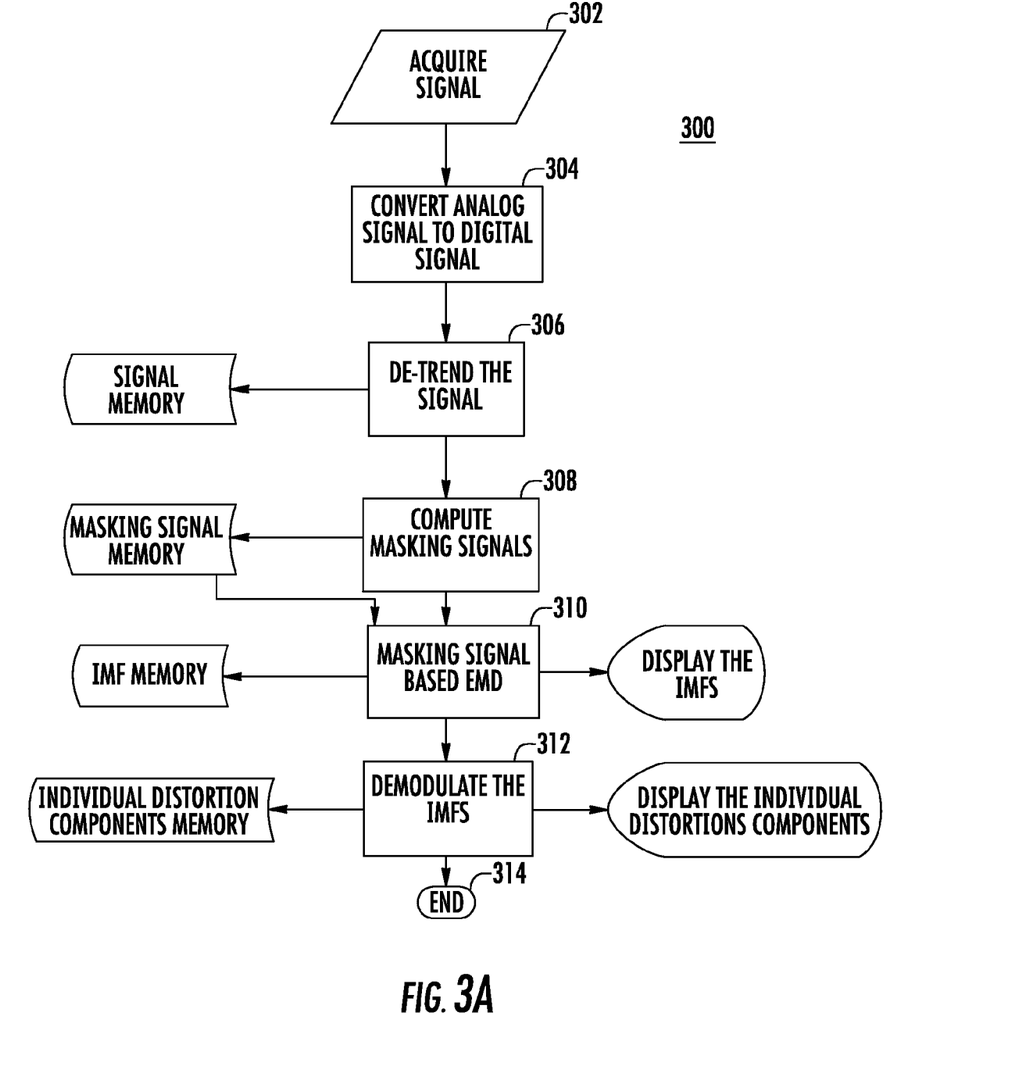
FIGS. 3A-3C are flowcharts of exemplary steps of a method of signal processing, according to another embodiment of the invention.
Figure 3B:
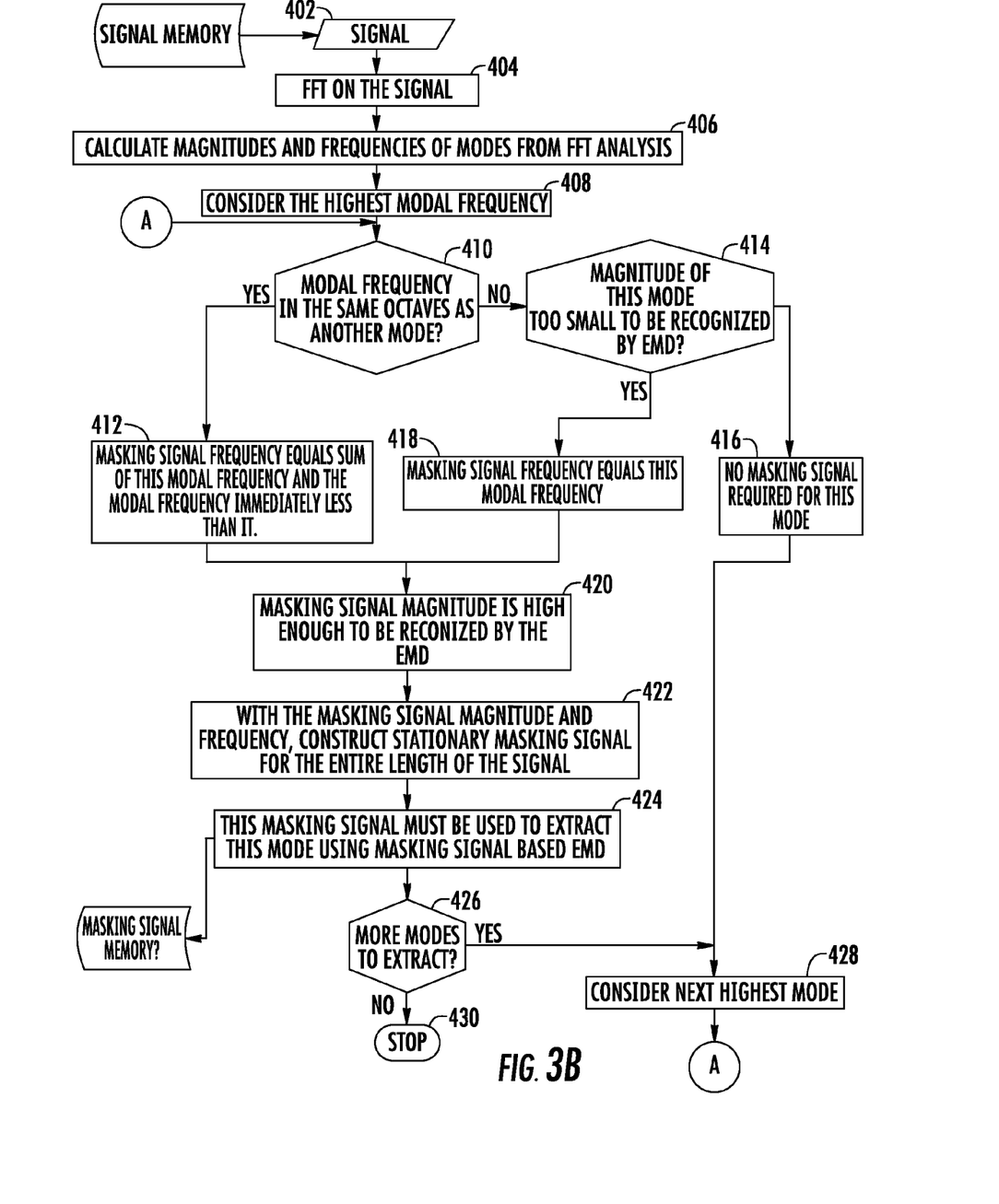
Figure 3C:
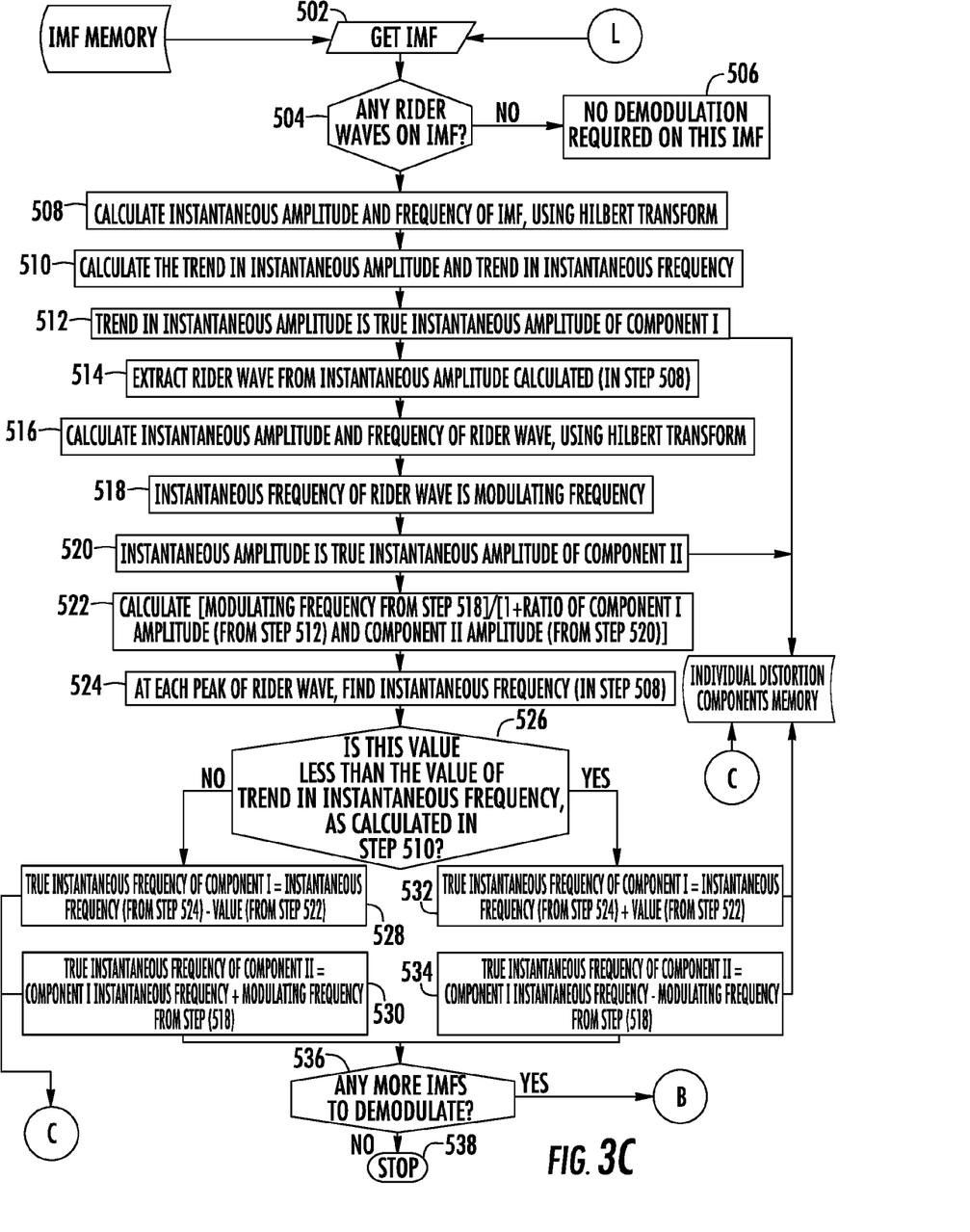

Referring now to FIGS. 3A-3C, certain method aspects of the invention are illustrated. FIG. 3A is a flowchart of exemplary steps of a method 300 for processing signals, according to one embodiment of the invention. Signal acquisition occurs at step 302, followed at 304 by conversion of the signal to a digital signal if the acquired signal is in analog. At step 306, the signal is de-trended and stored in a signal memory. Masking signals are computed at step 308. The masking signals can be stored in a masking signal memory and be recalled at step 310 for performing the masking-signal-based EMD. The resulting IMFs can be stored in an IMF memory and/or visually presented. The IMFs are demodulated at step 312. The resulting distortion components obtained from the demodulation can also be stored in memory and/or visually presented. The method concludes at step 314.

Referring additionally to FIG. 3B, the exemplary steps for generating masking signals are more particularly illustrated. At step 402, a stored signal is retrieved from memory, and the FFT is performed at step 404 to obtain, at step 406, the magnitudes and frequencies of the modes. At step 408, the highest modal frequency is examined. If at step 410 it is determined that the this frequency is within an octave of another mode's frequency, then at step 412 the masking signal frequency is set equal to the sum of this modal frequency and the modal frequency immediately less than it. Otherwise, a determination is made at step 414 as to whether the magnitude of the mode is too small to be recognized with EMD. If not, then at step 416 it is determined that no masking signal is needed for this mode. However, if the magnitude of the mode is too small to be recognized by the EMD, then at step 418, the masking signal frequency is set equal to the mode's frequency. At step 420, the resulting masking signal magnitude is sufficiently high to be recognized by the EMD. A stationary masking signal for the entire length of the signal is constructed with the masking signal magnitude and frequency at step 422. At step 424 this masking signal is used to extract this mode using the masking-signal-based EMD. The determination is made at step 426 as to whether there are additional modes to extract, and if so, then at step 428 the next highest mode is analyzed according to the same steps. Otherwise the method illustratively concludes at step 430.

Referring additionally to FIG. 3C, exemplary steps for demodulation, according to the invention, are more particularly illustrated. An IMF is retrieved at step 502, and a determination is made at step 504 as to whether there are any rider waves on the IMF. If not, then it is determined that no demodulation is required for this IMF at step 506. Otherwise instantaneous amplitude and frequency of this IMF are calculated at step 508 using the Hilbert transform. At step 510, the trend in the instantaneous amplitude and trend in the instantaneous frequency are calculated. Trend in the instantaneous amplitude is determined at step 512 to be the true instantaneous amplitude of Component I. At step 514, the rider wave is extracted from the instantaneous amplitude calculated at step 508, and at step 516 the instantaneous amplitude and frequency of the rider wave is calculated using the Hilbert transform. The instantaneous frequency of the rider wave is determined to be the modulating frequency at step 518, and the instantaneous amplitude is determined at step 520 to be the true instantaneous amplitude of Component II.

At step 522, the following calculation is performed: calculate [modulating frequency from step 518]/[1+ratio of Component I amplitude (from step 512) and Component II amplitude (from step 520)]. At each peak of rider wave, the instantaneous frequency (from step 508) is found at step 524. At step 526, it is determined whether this value is less than the value of trend in instantaneous frequency as calculated in step 510. If not, then at step 528 the true instantaneous frequency of Component I equals instantaneous frequency from step 524 minus the value from step 522, and at step 530, the true instantaneous frequency of Component II equals Component I instantaneous frequency plus modulating frequency from step 518. Otherwise, if the value is less than the value of trend in instantaneous frequency as calculated in step 510, then at step 532, the true instantaneous frequency of Component I equals instantaneous frequency (from step 524) plus the value from step 522, at step 534, the true instantaneous frequency of Component II equals Component I instantaneous frequency minus the modulating frequency (from step 518).

Figure 4A:
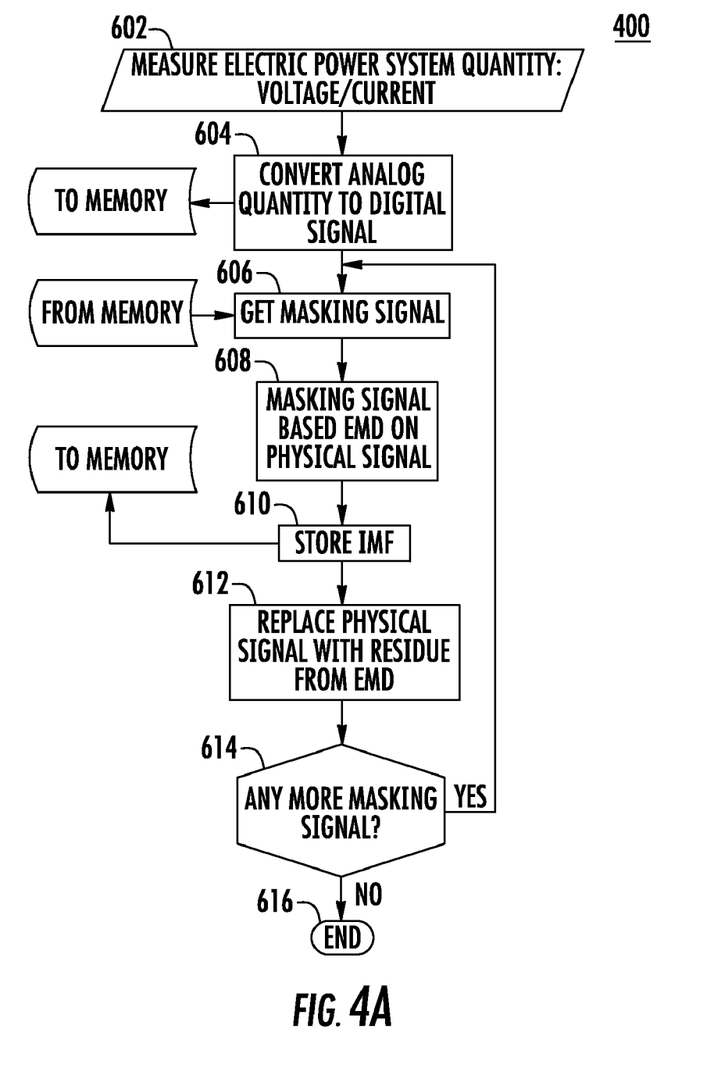
FIGS. 4A-4D are flowcharts of exemplary steps in a method for processing electrical signals, according yet another embodiment of the invention.

Referring now to FIGS. 4A-4D, aspects of the invention are applied in the context of measuring electric power system quality, according to yet another embodiment. FIG. 4A is flowchart of exemplary steps for making such a measurement. Illustratively, at step 602 a signal indicative of electric power system quality, such as voltage and/or current, is measured. At step 604, the signal is converted from analog to digital form. A masking signal is retrieved from memory at step 606 and is used at step 608 to perform masking-signal-based EMD on the signal. The IMFs obtained by performing the masking-signal-based EMD are stored at step 610. At step 612, the physical signal is replaced with the residue determined by performing the masking-signal-based EMD. The steps are repeated if there are more masking signals at step 614. Otherwise, the method illustratively concludes at step 616.

Figure 4B:
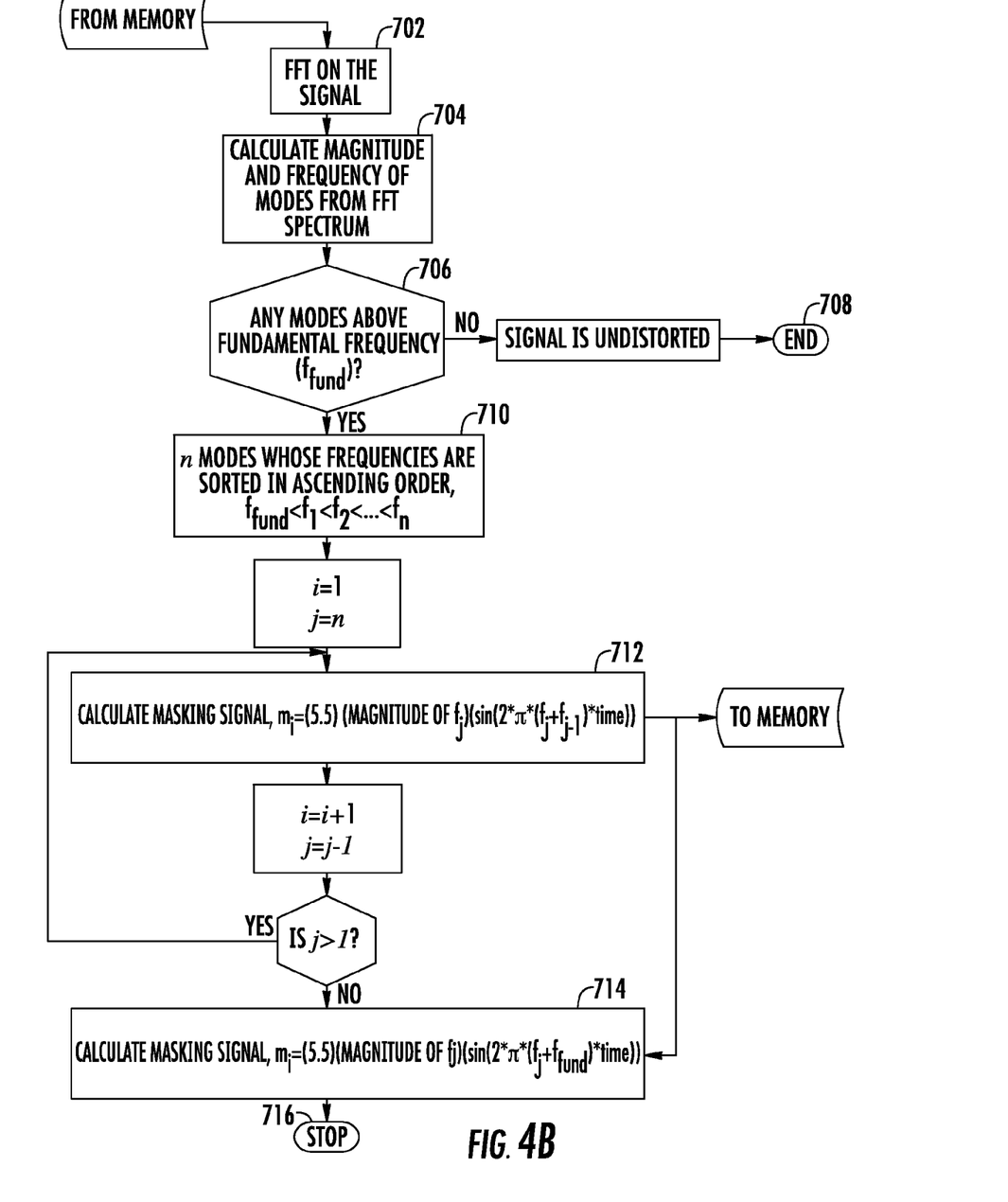

Referring additionally to FIG. 4B, exemplary steps for determining a masking signal are shown. At step 702 a signal is retrieved and FFT performed on the signal. The magnitude and frequency of the modes are calculated from the FFT spectrum at step 704. At step 706, a determination is made as to whether any mode frequency is greater than the fundamental frequency. If not, then the signal is undistorted and the method concludes at step 708. Otherwise, the modes whose frequencies are greater are sorted in ascending order at step 710. The masking signal, $m_i$, is calculated at step 712 according to the following formula:

$$m_i=(5.5)(\text{Magnitude of } f_j)(\sin(2*\pi*(f_j+f_{j-1})*\text{time}))710$$

The calculation is iteratively repeated so long as the index j is greater than one, and when j equals one, the masking signal is calculated at step 714 to be $$m_i=(5.5)(\text{Magnitude of } f_j)(\sin(2*\pi*(f_j+f_{fund})*\text{time}))$$

at step 714. The method then illustratively concludes at step 716.

Figure 4C:
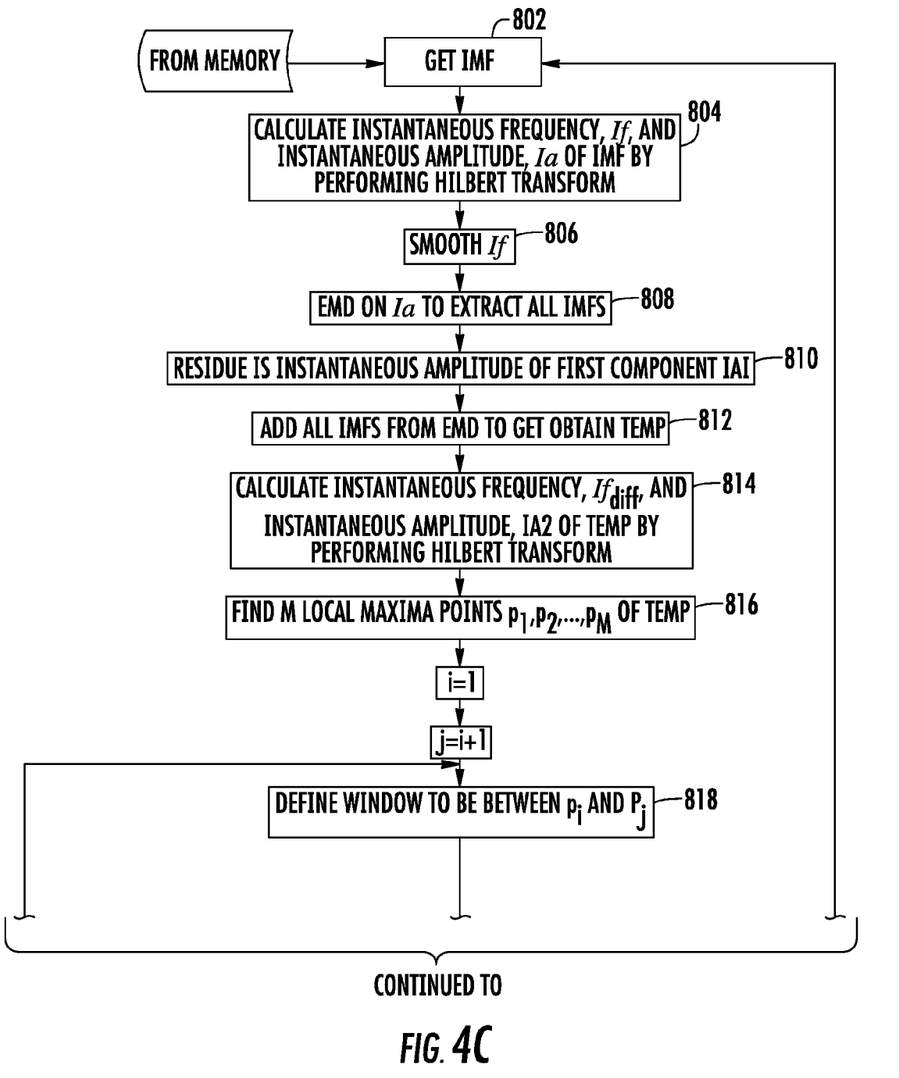
Figure 4D:
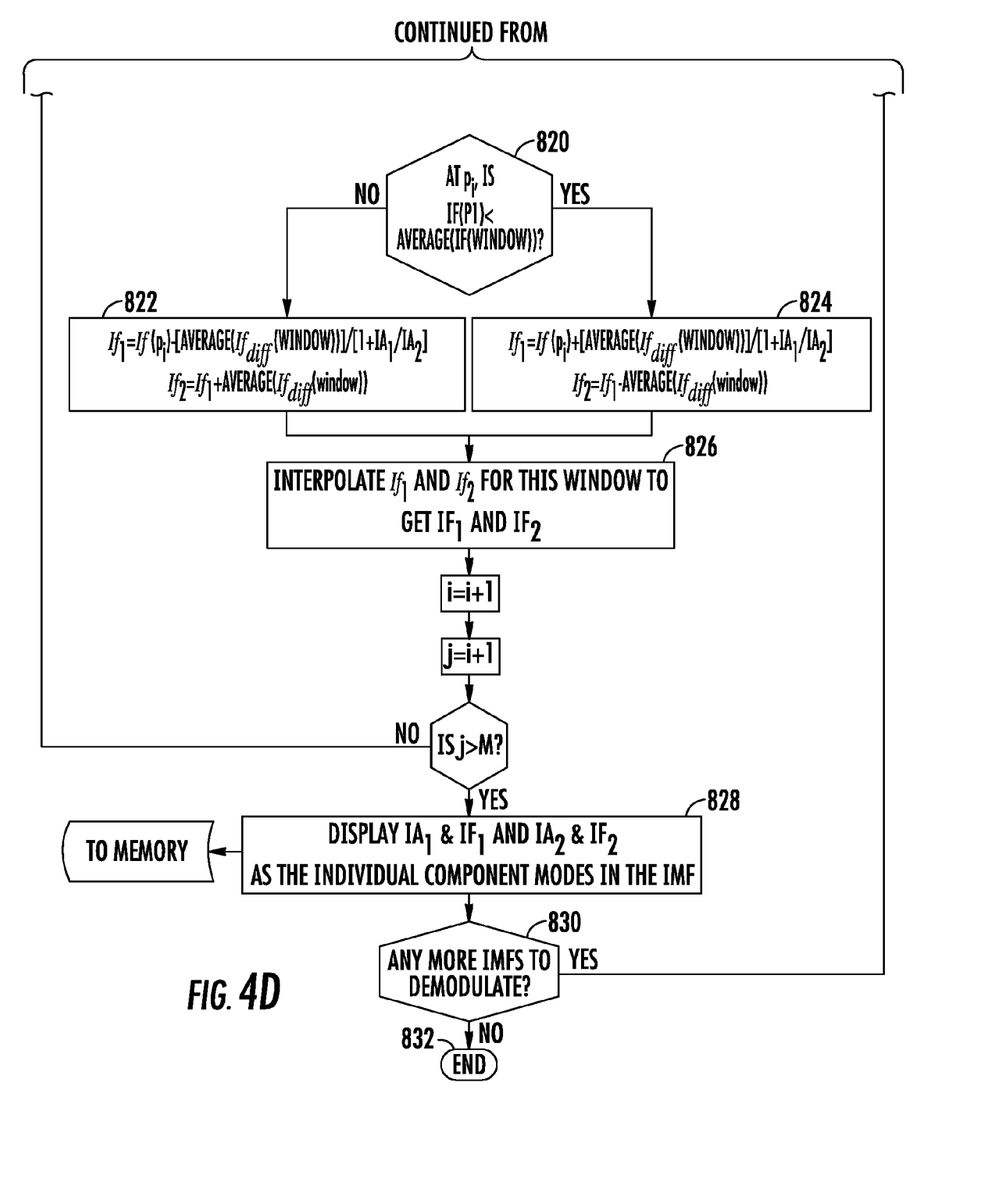

Referring now to FIGS. 4C and 4D, exemplary steps for performing demodulation, according to the invention, are shown. At step 802, an IMF is retrieved, and the instantaneous frequency, If, and instantaneous amplitude, Ia, of the IMF is calculated by performing a Hilbert transform at step 804. At step 806, the If is smoothed. EMD is performed on Ia at step 808 to extract all IMFs. The residue is determined at step 810 and is the instantaneous amplitude of first component $IA_1$. All IMFs obtained from EMD are added to get obtain temp at step 812. At step 814 the instantaneous frequency, $If_{diff}$, is calculated as is the instantaneous amplitude, $IA_2$ of temp by performing Hilbert transform. The M local maxima points, $p_1$, $p_2$, ..., $p_M$, of temp are found at step 816. The window is defined to be between $p_i$ and $p_j$ at step 818. In step 820, at $p_i$, it is determined whether $If(p_i)$ is less than average($If$(window)). If not, then at step 822, $$If_1=If(p_i)-[\text{average}(If_{diff}(\text{window}))]/[1+IA_1/IA_2], \text{ and}$$

$$If_2=If_1+\text{average}(If_{diff}(\text{window}))$$

Otherwise, at step 824, $$If_1 = If(p_i) + [\text{average}(If_{dif}(\text{window}))]/[1 + IA_1/IA_2], \text{ and}$$

$$If_2 = If_1 - \text{average}(If_{dif}(\text{window}))$$

At step 826, $If_1$ and $If_2$ are interpolated for this window so as to obtain $IF_1$ and $IF_2$. Steps 818 through 826 are repeated so long as the index j is not greater than M. Finally, when the index is greater than M, $IA_1$ and $IF_1$ as well as $IA_2$ and $IF_2$ are displayed at 828. At step 830, the procedure returns to step 802 if there are more IMFs to demodulate. When there are no more, the method illustratively concludes at step 832.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, such as magnetic tape or optically-readable disk comprising a computer program, which when loaded in and executed by a computer or computer system is able to carry out the methods and procedures described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented method of signal processing comprising:
   generating at least one masking signal based upon a computed Fourier transform of a signal received from a sensor or a transducer in response to the occurrence a a physical phenomena, the Fourier transform computed by applying a Fast Fourier Transform (FFT) to the received signal;
   determining at least one intrinsic mode function (IMF) of the received signal by performing a masking-signal-based empirical mode decomposition (EMD) using the at least one masking signal; and
   replacing the received signal with a corresponding residue signal generated during the performing of the masking signal-based EMD, wherein the residue signal exhibits the general trends of the received signal,
   wherein the generating step comprises calculating a magnitude and frequency of each mode in an FFT spectrum generated by applying the FFT to the received signal, determining whether a highest modal frequency is within an octave of that another mode in the FFT spectrum, and if so, generating a masking signal having a frequency equal to the sum of the highest modal frequency and a next lower modal frequency.

2. The computer-implemented method of claim 1, further comprising demodulating each IMF determined for the received signal.

3. A computer-implemented method of signal processing comprising: generating at least one masking signal based upon a computed Fourier transform of a signal received from a sensor or a transducer in response to the occurrence a a physical phenomena, the Fourier transform computed by applying a Fast Fourier Transform (FFT) to the received signal;
   determining at least one intrinsic mode function (IMF) of the received signal by performing a masking-signal-based empirical mode decomposition EMD using the at least one masking signal; and
   replacing the received signal with a corresponding residue signal generated during the performing of the masking signal-based EMD, wherein the residue signal exhibits the general trends of the received signal,
   wherein the generating step comprises calculating a magnitude and frequency of each mode in an FFT spectrum generated by applying the FFT to the received signal, determining whether a highest modal frequency is within an octave of another mode frequency in the FFT spectrum, and if not, determining whether the magnitude of the mode having the highest modal frequency is large enough to be recognized by performing an EMD, wherein if the magnitude of the of the mode having the highest modal frequency is large enough to be recognized by performing an EMD, then the masking signal frequency equals the frequency of the mode having the highest modal frequency.

4. A computer-implemented method of estimating time-varying distorted electrical signals, the method comprising:
   determining whether a received electrical signal comprises a distorted signal;
   generating at least one masking signal based upon a computed Fourier transform of the received electrical signal if the received electrical signal comprises a distorted signal; and
   determining at least one intrinsic mode function (IMF) of the received electrical signal by performing a masking-signal-based empirical mode decomposition (EMD) using the at least one masking signal; and
   replacing the received signal with a corresponding residue signal generated during the performing of the masking signal-based EMD, wherein the residue signal exhibits the general trends of the received signal,
   wherein determining whether the received electrical signal is a distorted signal comprises performing a fast Fourier transform FFT with resect to the received electrical signal, calculating magnitudes and frequencies of each mode of a resulting FFT spectrum, and determining that the received electrical signal is a distorted signal if a frequency of any mode is greater than a determined fundamental frequency.

5. The computer-implemented method of claim 4, further comprising demodulating each IMF determined for the received signal.

6. The computer-implemented method of claim 4, wherein the received electrical signal comprises an analog voltage signal having a time-varying distorted waveform, and further comprising performing an analog-to-digital conversion on the voltage signal.

7. The computer-implemented method of claim 4, wherein the received electrical signal comprises an analog current signal having a time-varying distorted waveform, and further comprising performing an analog-to-digital conversion on the current signal.

8. The computer-implemented method of claim 4, further comprising visually presenting each IMF obtained by performing the masking-signal-based EMD.

9. The computer-implemented method of claim 5, further comprising visually presenting each individual distortion component of the received signal obtained by demodulating each IMF determined for the received signal.

10. A signal processing system comprising:
a signal interface for receiving an external signal; and
a processor communicatively linked to said signal interface, wherein said processor includes
a masking signal generating module configured to generate at least one masking signal based upon a computed Fourier transform of the received external signal;
an IMF determining module configured to determine at least one intrinsic mode function (IMF) of the received external signal by performing a masking-signal-based empirical mode decomposition (EMD) using the at least one masking signal; and
a de-trending module for de-trending the received external signal.

11. The signal processing system of claim 10, wherein said processor further comprises a demodulating unit configured to demodulate each IMF determined for the received external signal.

12. The signal processing system of claim 10, wherein the received external signal comprises an analog electrical signal, and further comprising analog-to-digital (A/D) converter linked to said processor for performing an A/D conversion on the electrical signal.

13. The signal processing system of claim 10, further comprising a visual interface for visually presenting each IMF obtained by performing the masking-signal-based EMD.

14. The signal processing system of claim 11, further comprising a visual interface for visually presenting each individual distortion component of the received external signal, each distortion component being obtained by demodulating each IMF determined for the received external signal.

* * * * *